Figures 1, 2:
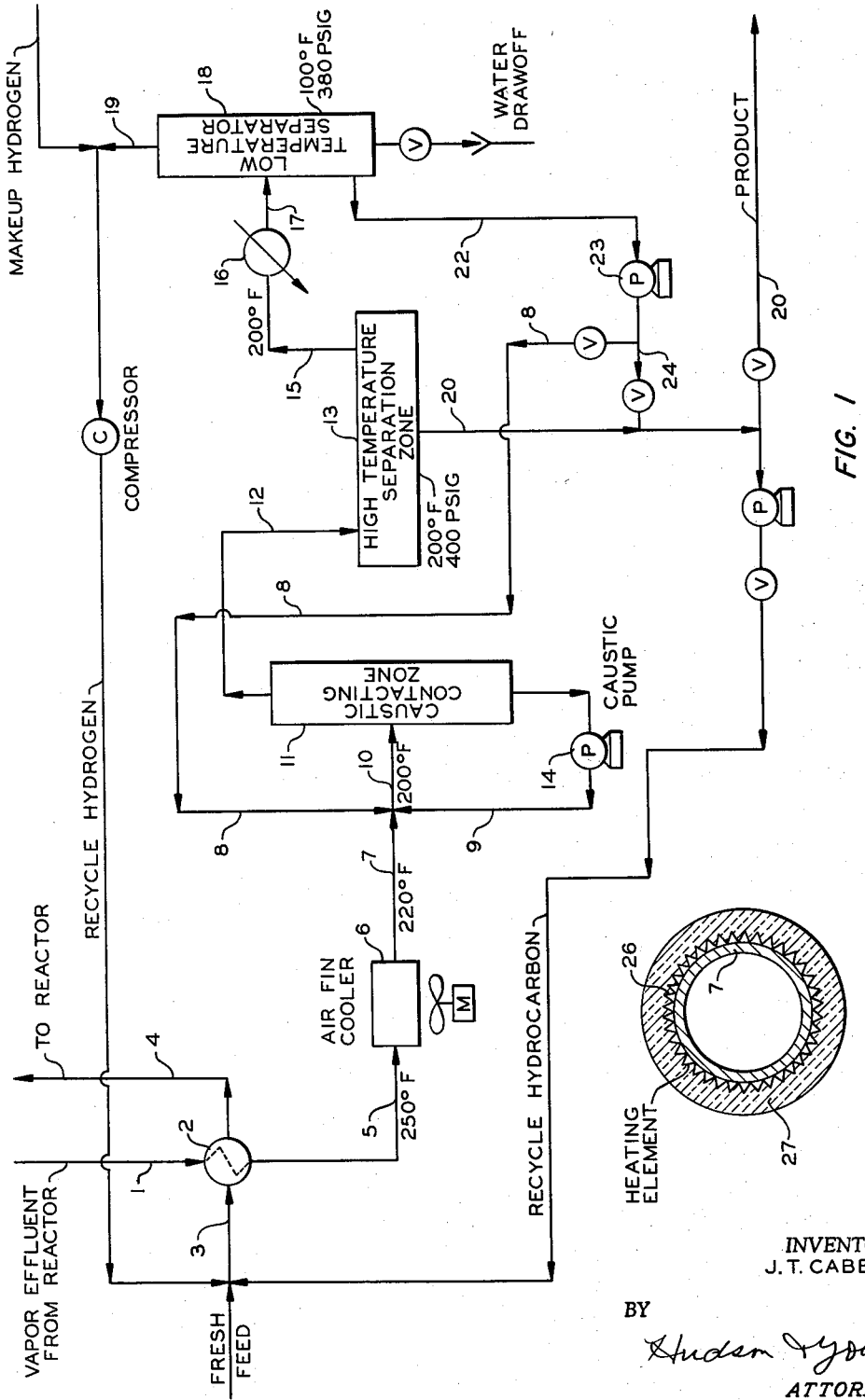

June 27, 1961 J. T. CABBAGE 2,990,431
CORROSION CONTROL IN CONDENSING SYSTEMS
Filed Sept. 17, 1958

INVENTOR.
J. T. CABBAGE
BY
Hudson Young
ATTORNEYS

2,990,431
CORROSION CONTROL IN CONDENSING SYSTEMS
John T. Cabbage, Bartlesville, Okla., assignor to Phillips Petroleum Company, a corporation of Delaware
Filed Sept. 17, 1958, Ser. No. 761,527
9 Claims. (Cl. 260—667)

This invention relates to elimination of corrosion. In one of its aspects, it relates to the handling of a conversion effluent containing acid generating or acidic substances which, when in contact with liquid water, cause corrosion of apparatus containing said effluent, the said handling comprising maintaining said effluent above the dew point of water under the conditions under which it is passed to a point of neutralization and then cooling said effluent to a temperature at which effective neutralization takes place just prior to contacting said effluent with a neutralizing agent. In another of its aspects, the invention relates to the prevention of corrosion by hydrogen chloride in a system such as a hydrogenation system by maintaining the vapor effluent at a temperature above the dew point of water until just before the effluent is contacted with a neutralizing agent and a stream of cooled, treated liquid effluent. In a more specific aspect of the invention, corrosion is prevented in a system in which a catalytic hydrogenation process effluent is neutralized to eliminate hydrogen chloride therefrom which is contained therein due to conversion during hydrogenation of organic chlorides in the original feed which comprises maintaining said effluent above the dew point of water, admixing said effluent with earlier neutralized effluent just prior to neutralization to reduce its temperature to one at which effective neutralization can occur in a desirable manner without vaporization of neutralizing agent and then neutralizing said effluent with said agent. In a specific embodiment of the invention, corrosion in the system by hydrogen chloride produced from organic chlorides in the feed to a catalytic hydrogenation process, or from chlorides on the catalyst, is prevented by maintaining the effluent from the hydrogenation process above the dew point of water, e.g., about 225° F., to prevent water condensation and then adding a stream of cooled liquid hydrocarbon which can be a stream which has been previously treated, as here described, following which the now cooled effluent is immediately contacted with a solution of caustic alkali.

It is known to inject alkali into various conversion effluents to prevent corrosion of equipment by acid generating or acidic substances in the effluent when said effluent is cooled to, or below, the dew point of water. However, contact with ammonia gas and other like materials leaves ammonia or other of said materials in the recycle hydrogen which, as it is known, is usually recovered from the hydrogenation effluent and recycled thereto. It is also known that ammonia is not desirable in the recycle hydrogen due to its deactivating effect on the catalyst. Therefore, a non-volatile neutralizing agent, such as caustic or caustic soda, in an aqueous solution is ordinarily used. If the temperature is kept above the dew point of water until the neutralizing agent is added, there results evaporation of water from the neutralization agent composition with consequent plugging of the equipment with dry caustic or caustic soda downstream of the point of injection thereof. I have now conceived that just prior to or simultaneously with the injection of the caustic solution or other equivalent solution into contact with the effluent, there should be also introduced a coolant which can be a recycle stream of treated hydrogenation effluent, thus to reduce the temperature of the admixture of neutralizing agent and effluent, avoiding evaporation of water from neutralizing agent and its carry-over and deposition in the equipment.

It is an object of this invention to provide method and means for the elimination of corrosion. It is another object of this invention to provide method and means for the elimination of corrosion caused by the cooling and consequent condensation of acid or acid-forming materials and water in equipment in which an effluent containing said acid or acid-forming material and water vapor is neutralized. It is another object of this invention to neutralize a hydrocarbon hydrogenation effluent which contains acid or acid-forming materials and water vapor without corrosion of the apparatus containing said effluent just prior to its neutralization.

Other aspects, objects and the several advantages of this invention are apparent from a consideration of this disclosure, the drawing and the appended claims.

According to the present invention, there are provided a method and apparatus for substantially eliminating corrosion of equipment used to process an effluent which, as produced, is above the dew point of water in the equipment under the conditions prevailing upon its production and which contains acid generating or acidic material which, when in contact with liquid water, causes corrosion of apparatus containing the same and which effluent is neutralized in the ensuing treatment, the method comprising maintaining said effluent above the dew point of water in the equipment under the conditions prevailing upon said effluent, and contacting the effluent with a neutralizing agent under conditions below the dew point of water.

The method of the invention is particularly adapted to the prevention of corrosion by hydrogen chloride produced from organic chlorides in a feed to a catalytic hydrogenation process or from chlorides on the hydrogenation catalyst used in such a process when the effluent from such a process is being conveyed to or is at point at which neutralization is to be accomplished.

When water is present in the system or carried in by the feed or produced in the reaction in such a process or equivalent process, the reactor effluent becomes very corrosive as soon as it is cooled to the dew point of water and actually corrosion will take place even before the average temperature is reduced to the dew point of water because water condensation occurs on cold surfaces such as condenser tube walls and pipe walls. Thus, the hydrogen chloride or other acid-forming material dissolves in any liquid water in the system causing corrosion. This hydrogen chloride can, of course, be easily neutralized by injecting ammonia gas but such a step would leave ammonia in the effluent and/or in the recycle hydrogen when such hydrogen is involved and further, since ammonia deactivates many catalysts, especially many of those utilized in hydrogenation, the use of ammonia is desirably avoided. Indeed, the use of most any volatile neutralizing agent is to be avoided and use made of a non-volatile neutralizing agent. In any event, the agent is preferably non-volatile under the conditions of neutralization and caustic solution is considered to meet the requirements. However, caustic solution can not be used at elevated temperatures, that is, temperatures above the dew point of water because the evaporation of water causes concentration and crystallization of the caustic with the consequent plugging of equipment with dry caustic.

The problem which this invention solves then is the control of corrison up to the locus of contact of neutralizing agent with the reactor effluent at which locus, of course, the corrosion effect of the hydrogen chloride or other corrosive material is negated.

In the case of a hydrogenation effluent from a process in which a hydrocarbon is hydrogenated under conditions producing an effluent containing hydrogen chloride and water, the effluent from the reactor is cooled to a temperature which is still sufficiently high to prevent water condensation, in this instance approximately 220° F.

The temperature of the effluent is maintained at this level until the aqueous neutralizing agent is added directly to the reactor effluent at this temperature. There is also added to the effluent a stream of cool liquid hydrocarbon which has earlier been treated according to the invention, thus virtually simultaneously cooling the effluent below the dew point of water therein and neutralizing harmful acidic substances therein, substantially completely avoiding corrosion of the equipment. Although it is not absolutely necessary that the cooled liquid hydrocarbon be added to the effluent at precisely the instant the effluent is to be neutralized, in the now preferred form of the invention, the cooling by treated effluent or other means preferably is practiced substantially simultaneously with the neutralization, thus obtaining maximum benefit of the invention. The temperature of the cooling agent or cooling means selected should be such that upon addition of the neutralizing agent or solution, there will occur no substantial dehydration and crystallization of the neutralizing agent, thus avoiding carry-over of caustic or other material undesired downstream in the apparatus.

By use of the method of the invention, the usual requirements of expensive alloy heat exchangers and ancillary equipment ordinarily used to bring down the reactor effluent temperature to caustic washing temperatures are completely avoided.

It is within the scope of the present invention to operate all steps with automatic controls.

Referring now to the drawing, in FIGURE 1 there is shown diagrammatically the treatment of an effluent from a hydrogenation reactor, not shown, employing the various steps of the invention as it is embodied in a specific embodiment. FIGURE 2 shows in cross-section, construction of a pipe containing a heating element and outer insulation suitable for conveying the effluent from a preliminary cooler to the point at which the effluent is admixed with neutralizing agent, as more fully described below.

Referring now to FIGURE 1, hydrogenation effluent from a reactor, not shown, in which reactor an aromatic hydrocarbon is hydrogenated to convert the same to a more desirable product, is passed by way of pipe 1 at a temperature of 500° F. into heat exchanger 2 wherein it is heat-interchanged with fresh feed, recycle hydrocarbon and hydrogen which enters the heat exchanger by way of pipe 3 and is passed to the reactor by way of pipe 4. Cooled hydrogenation effluent at a temperature of 250° F. passes by pipe 5 through air fin cooler 6, leaving the cooler by way of pipe 7 at a temperature of 220° F. There is introduced by way of pipe 8 into pipe 7, treated liquid hydrocarbon at a temperature of 100° F. or slightly lower and there is also introduced by way of pipe 9 into pipe 7, caustic treating solution resulting in a final admixture in pipe 10 having a temperature of approximately 200° F. This admixture is discharged into caustic contacting zone 11 wherein neutralization is completed and from which no appreciable caustic is carried over through pipe 12 which conveys the treated hydrogenation effluent into high temperature separation zone 13. Caustic from zone 11 is pumped by way of pump 14 and pipe 9 to pipe 7. Though not shown, it is within the scope of the invention to periodically or continuously remove a portion of the caustic from zone 11 and to replace it with fresh treating agent or solution. From high temperature separation zone 13, which is operated at a temperature of 200° F. and about 400 pounds per square inch gage, gases including hydrogen, which is recycled, are taken off by way of pipe 15, cooler 16 and passed by way of pipe 17 into low temperature separation zone 18. The temperature in this zone is about 100° F. and the pressure is 380 pounds per square inch gage. Recycled hydrogen gas is passed by way of pipe 19 to pipe 3 and from there by way of heat exchanger 2 and pipe 4 to the reactor.

Hydrogenated hydrocarbon product is drawn off from zone 13 by way of pipe 20. Also, liquid hydrocarbon from which gases have been separated in zone 18 is passed by way of pipe 22, pump 23 and pipe 8 to pipe 7 for use as earlier described. Excess liquid hydrocarbon removed from zone 18 is passed by pipe 24 to pipe 20 for removal as product.

Referring now to FIGURE 2, which is a cross-sectional view of pipe 7, the pipe wall is surrounded by a heating element 26 and insulation 27. A temperature recorder controller sensing the temperature of the effluent in pipe 7 is used to control the flow of electricity to the heating element. It is within the scope of the invention to use other means for heating the effluent in pipe 7 such as hot water pipe, etc., as will be understood by one skilled in the art in possession of this disclosure.

Following is a specific operation in accordance with this invention showing the reactor total charge, reactor effluent, caustic injection, and hydrocarbon injection, etc.:

|  | Number mols/hour | | | |
| --- | --- | --- | --- | --- |
|  | Fresh | Recycle | $H_2$ makeup | Total |
| Reactor feed (3): | | | | |
| Pentane and lighter | 12.8 | 12.8 |  | 25.6 |
| Dimethylcyclopentane | 27.1 | 27.1 |  | 54.2 |
| Cyclohexane | 3.6 | 8.7 |  | 12.3 |
| Benzene | 5.1 |  |  | 5.1 |
| Normal hexane | 34.3 | 34.3 |  | 68.6 |
| Isohexane | 17.1 | 17.1 |  | 34.2 |
| Hydrogen |  | 23.7 | 15.3 | 39.0 |
| Total | 100.0 | 123.7 | 15.3 | 239.0 |

Reactor effluent (5):[1]
  Pentane and lighter ____No. mols per hour__ 25.6
  Dimethylcyclopentane _____do____ 54.2
  Cyclohexane _____do____ 17.4
  Normal hexane _____do____ 68.6
  Isohexane _____do____ 34.2
  Hydrogen _____do____ 23.7

Total _____ 223.7

[1] Contains water vapor and hydrogen chloride vapor.

Caustic injection (9):
  Rate, gallon per hour _____ 2,500
  Concentration, ° Bé _____ 25
  Temperature, ° F. _____ 200

Recycle hydrocarbon(8):
  Rate, gallons per hour _____ 500
  Temperature, ° F. _____ 100

Product Yield (20):
  Pentane and lighter __ No. mols per hour__ 12.8
  Dimethylcyclopentane _____do____ 27.1
  Cyclohexane _____do____ 8.7
  Normal hexane _____do____ 34.3
  Isohexane _____do____ 17.1

Total _____ 100.0

The total charge material passes over a nickel catalyst (finely divided nickel on kieselguhr) in the reaction zone (not shown). Such zone operates at 400–450° F. and at about 450–500 p.s.i.g., as is known in the art, to produce a saturated hydrocarbon effluent. This effluent is treated in accordance with this invention, said effluent containing water vapor and hydrogen chloride, with substantially no corrosion of the system.

Reasonable variation and modification are possible within the scope of the foregoing disclosure, drawing and the appended claims to the invention, the essence of which is that there have been provided a method and means for cooling and neutralizing an effluent such as a conversion effluent, more particularly a hydrogenation effluent, by maintaining said effluent above the dew point of water in the system until just about the time when the neutralizing agent is added, thus accomplishing the cooling of the effluent to an effective neutralizing temperature without corrosion and without carry-over of the neutralizing agent undesirably into the neutralized effluent stream.

I claim:

1. A method for substantially eliminating corrosion of equipment used to process an effluent stream which, as produced, is above the dew point of water in the equipment under the conditions prevailing upon its production and which contains acid generating or acidic material, which in contact with liquid water, causes corrosion of apparatus containing the effluent stream and which effluent stream is neutralized in ensuing treatment and wherein the neutralizing agent will be crystallized and undesirably plug equipment unless neutralization is effected at a temperature at or below the dew point of water, the steps which comprise maintaining said effluent stream above the dew point of water in the equipment under the conditions prevailing upon said effluent stream and then admixing with said effluent stream a neutralizing agent under conditions below the dew point of water and such as to maintain water as a liquid in presence of said agent.

2. A method according to claim 1 wherein the effluent is contacted with a coolant just about the time it is neutralized.

3. A method according to claim 1 wherein the neutralizing agent is caustic solution containing water and wherein just prior to introducing said solution, a cool stream of effluent which has been treated as in said claim is added to the effluent to bring its temperature down to a temperature at which crystallization of caustic, due to evaporation of water, is avoided.

4. A method according to claim 1 wherein a hydrogenation hydrocarbon effluent containing hydrogen chloride is maintained above the dew point of water therein until there is added to said effluent a coolant adapted to bring the effluent down to a temperature below the dew point of water and substantially simultaneously therewith a caustic neutralizing solution containing water.

5. A method for the neutralization of an acid stream of a hot hydrocarbon hydrogenation effluent which comprises cooling said stream of effluent to a temperature just above the boiling point of water contained in said effluent, then cooling said stream of effluent to a temperature just below the dew point of said water forming liquid water in said stream of effluent, substantially simultaneously with said last-mentioned cooling injecting into said stream of effluent a water solution of a non-volatile neutralizing agent, passing said stream of effluent and injected agent to a neutralizing zone, in said zone, providing residence time for the completion of the neutralization, separating the now-used solution of neutralizing agent from the now-neutralized effluent, and recovering and further processing said effluent.

6. A method of handling and treating a hot conversion effluent which contains water vapor and a substance which in the presence of liquid water will cause corrosion of the handling and treating equipment employed which comprises cooling said effluent to a temperature a few degrees above the dew point of the water vapor therein, then cooling said effluent to a temperature a few degrees below the dew point of water in said effluent sufficient to generate liquid water in said effluent, immediately admixing with said thus-cooled effluent a solution of a neutralizing agent in water, and recovering from said thus-treated effluent, non-corrosive effluent and said solution of said neutralizing agent.

7. A method according to claim 6 wherein the effluent upon admixture with the solution of said neutralizing agent is passed to a separation zone wherein said solution of neutralizing agent is separated therefrom, the effluent now free of said agent is then passed to an elevated temperature separation zone where the effluent free of neutralizing agent is further processed for separation into its component.

8. A method of handling and treating a hot conversion effluent which contains water vapor and a substance which in the presence of liquid water will cause corrosion of the handling and treating equipment employed which comprises cooling said effluent to a temperature just above the dew point of the water vapor therein, then substantially simultaneously injecting into said effluent a cooling medium at a temperature and in a quantity sufficient to generate liquid water in said effluent by cooling the same to a temperature a few degrees below its dew point and a solution of a non-volatile neutralizing agent, thus essentially simultaneously forming water in said effluent at the time when it is being neutralized, recovering from said effluent the injected and now-used solution of neutralizing agent and then further processing said effluent.

9. A method for the neutralization of a hydrogenation effluent containing water vapor and hydrogen chloride which will corrode the equipment in which the effluent is processed when liquid water is present and which effluent will cause plugging of the equipment if neutralization is practiced upon said effluent at a temperature above the dew point of water due to the evaporation of liquid water from the neutralization agent used, depositing neutralization agent and, in some cases, a product of said neutralization, the improvement which comprises maintaining said effluent above the dew point of water at a temperature of about 225° F. until just about the point of neutralization is reached, then cooling said effluent to a temperature below the dew point of water at about 200° F. in said effluent to generate therein liquid water, immediately neutralizing said thus-cooled effluent, by admixing with said effluent as liquid water is generated therein, said neutralizing agent.

References Cited in the file of this patent

UNITED STATES PATENTS

| | | |
|---|---|---|
| 1,569,532 | Berry | Jan. 12, 1926 |
| 2,487,576 | Meyers | Nov. 8, 1949 |
| 2,499,435 | Whitacre | Mar. 7, 1950 |
| 2,621,216 | White | Dec. 9, 1952 |